June 24, 1930. O. G. SIMMONS 1,767,191
METHOD OF AND APPARATUS FOR GENERATING HELICAL GEARS
Filed March 26, 1928 7 Sheets-Sheet 3

INVENTOR:
Oliver G. Simmons.

INVENTOR:
Oliver G. Simmons

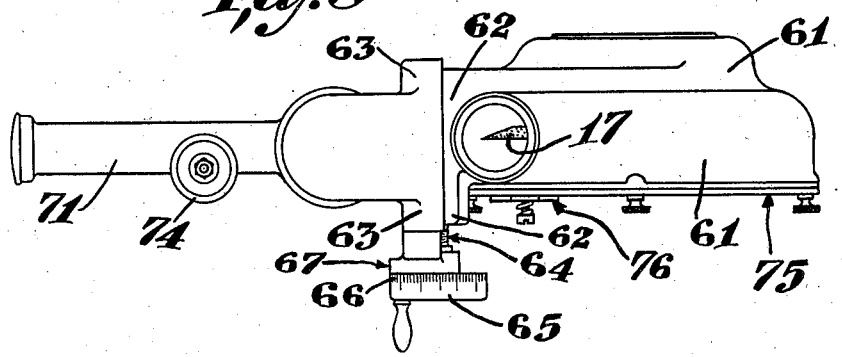
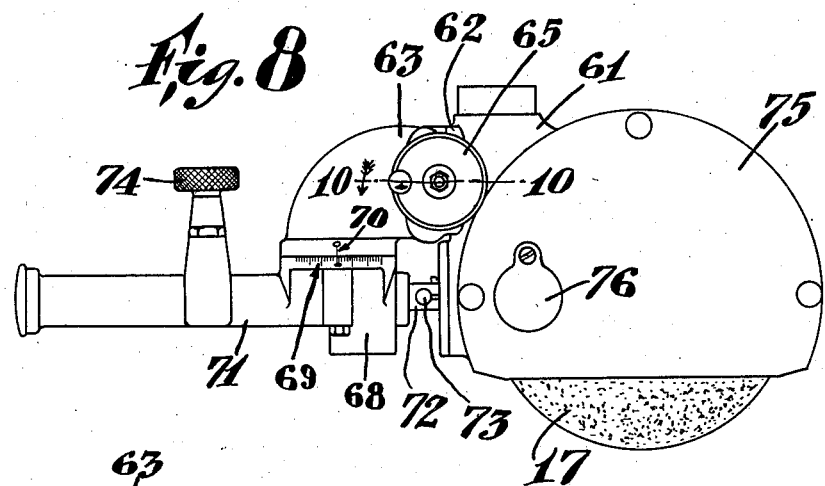
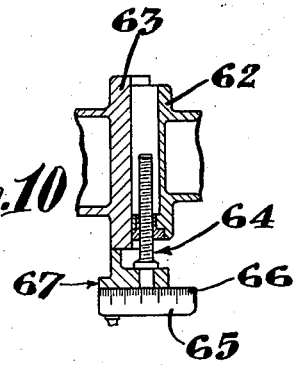

Patented June 24, 1930

1,767,191

UNITED STATES PATENT OFFICE

OLIVER G. SIMMONS, OF LAKEWOOD, OHIO

METHOD OF AND APPARATUS FOR GENERATING HELICAL GEARS

Application filed March 26, 1928. Serial No. 264,626.

The present invention relates to a method of and apparatus for generating the teeth of gears and gear shaped cutters and kindred articles of manufacture, and more particularly to a method of and apparatus for generating involute helicoid tooth surfaces.

My Patent No. 1,752,033, issued March 25, 1930, discloses a gear grinding machine which may be set to generate involute surfaces of any desired pressure angle on the teeth of a spur gear or gear shaped cutter of a given pitch diameter by means of an angular adjustment of the support upon which the work spindle slide is mounted without replacing any of the elements controlling the rolling movements of the work.

The present invention is an improvement over the invention disclosed in the patent above referred to and has for an important object to provide a method of and apparatus for generating involute helicoid tooth surfaces of any desired axial pressure angle and also of any desired helix angle by angular adjustments of the supports for the work and cutting element so that helicoid surfaces having a transverse curvature conforming to any one of an infinite series of involute curves and having a longitudinal curvature conforming to any one of an infinite number of helical curves, may be generated without replacing any of the elements controlling the rolling movements of the work.

In a machine such as disclosed in my patent above referred to, in which the support for the work spindle slide is angularly adjusted to generate tooth faces of different pressure angles, the angle of action with respect to the axis of the work is changed by angular adjustment of the support for the work spindle slide when the plane of the cutting element is disposed at an angle to the axis of the work, with the result that the cutting element does not generate a helicoid surface having a helix angle corresponding to the angular adjustment of the cutting element.

The present invention provides a method by which the cutting element may be adjusted with mathematical accuracy to a position to generate helicoid surfaces of any desired helix angle with the work support in any position of angular adjustment.

With the above and other objects in view, the invention may be said to comprise the method and apparatus as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Figures 6, 7:
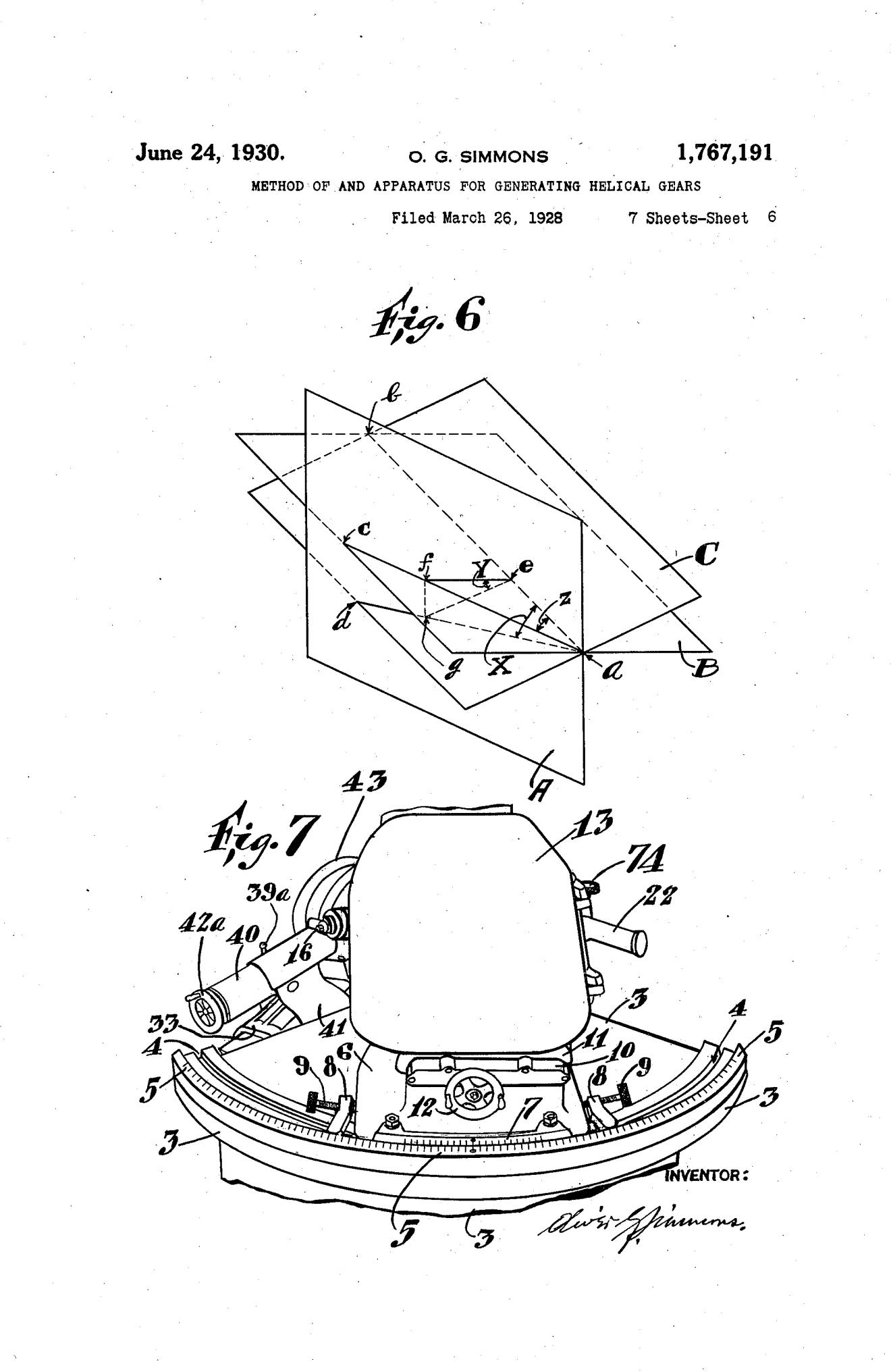

Fig. 6 is a geometrical view illustrating the derivation of the mathematical formula for positioning the cutting element at the proper angle to generate a helicoid tooth face of the desired helix angle.

Fig. 7 is a fragmentary perspective view showing the swiveled head and the vernier graduations on the base of the swiveled head co-operating with the graduated member secured to the bed of the machine.

Fig. 8 is a view in elevation of the helical cutter sharpening or dressing means mounted directly on the dust guard which encloses the grinding wheel.

Fig. 9 is a plan view of the structure shown in Fig. 8; and

Fig. 10 is a fragmentary section taken on the line indicated at 10—10 in Fig. 8.

Figure 1:
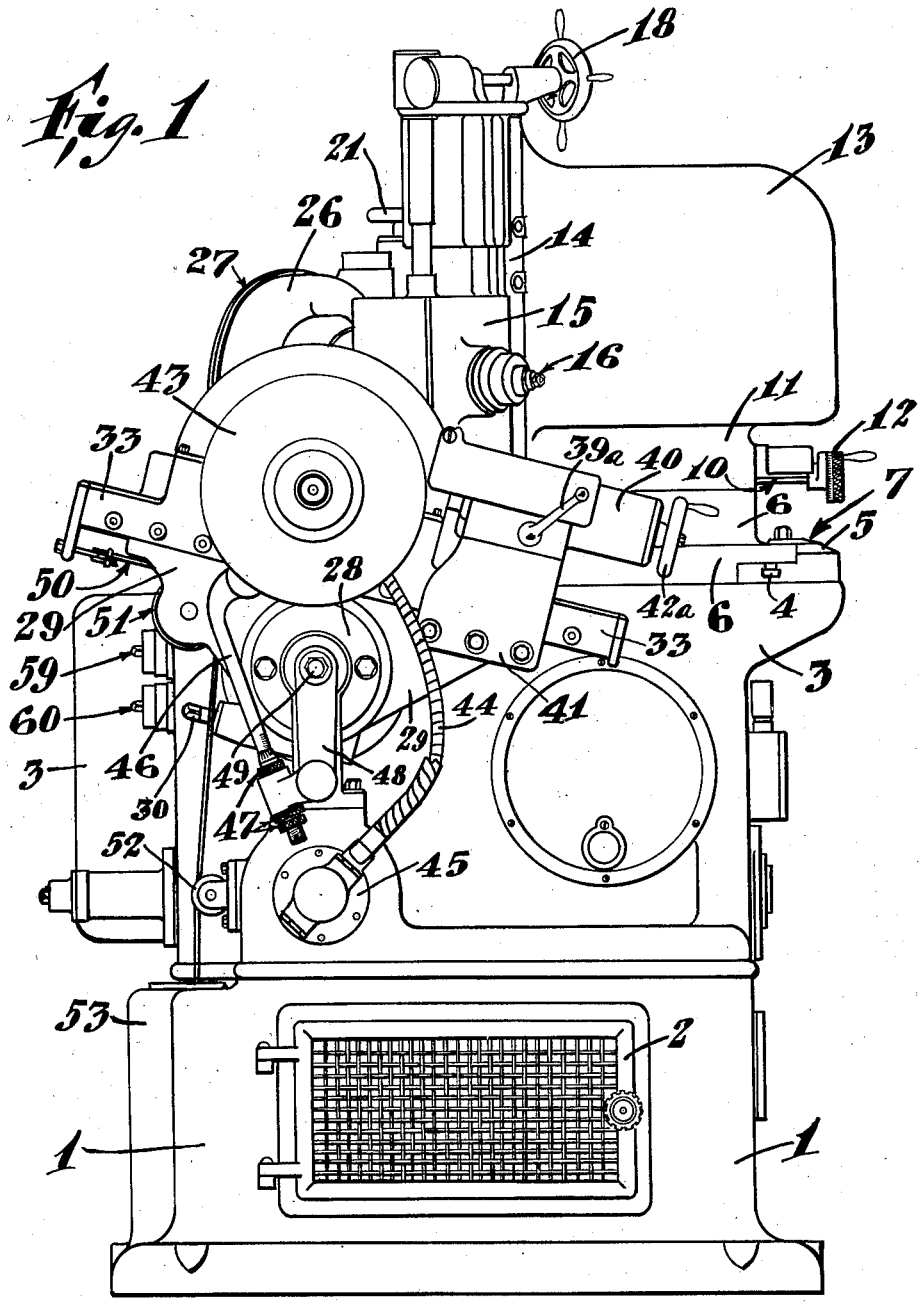
Figure 1 is a front view in elevation of a gear grinding machine embodying the invention.

Referring to the accompanying drawings, the machine of the present invention is mounted upon a hollow base 1 which serves as a housing for the main driving motor of the machine, the base 1 being provided with doors 2 which are provided with wire screening to provide ventilation for the motor within the base. Mounted upon the base 1, there is a bed 3 which is of segmental form and which is provided adjacent its outer edge with an arcuate guide groove 4, the base being also provided with an arcuate flange along its outer edge, which is provided with a scale 5 accurately graduated in units of angular measurement.

Mounted for angular adjustment on the bed 3, there is a swivel head 6 which is mounted to turn upon a fixed vertical pivot (not shown) located at the center of curvature of the arcuate guide groove 4. The head 6 has its outer end portion guided in the groove 4 and carries at its outer end a vernier scale 7 which co-operates with the scale 5 to accurately indicate angular positions of the head. The head 6 may be held in adjusted positions and accurately adjusted to a desired setting by means of clamps 8 adapted to be fixed to the bed upon opposite sides of the head and having transverse screws 9 which are engageable with opposite sides of the head. By adjustment of the screws 9, fine adjustments of the head with respect to the graduated scale 5 may be made.

The head 6 is provided with a radial way 10 upon which is mounted a slide 11 which may be adjusted toward and from the pivotal axis of the head by means of a suitable lead screw operated by a handwheel 12 at the outer end of the head. The slide 11 carries a motor housing 13 which has upon the inner end thereof a vertical guideway 14 upon which is mounted a slide 15 in which a horizontally disposed spindle 16 is journaled. The spindle 16 has attached thereto a grinding wheel 17 which is preferably provided with a flat face lying in a vertical plane. The slide 15 may be adjusted vertically by a suitable lead screw operated by a hand wheel 18 mounted at the top of the guideway 14 above the motor housing 13.

The grinding wheel is driven during the operation of the machine by means of a suitable electric motor (not shown) within the housing 13, which may be geared in any suitable manner to the grinding wheel spindle 16 to rapidly and continuously rotate the grinding wheel.

In order to maintain a smooth grinding surface on the face of the grinding wheel and to keep the tooth engaging portion in a single plane, means is provided for dressing the face of the grinding wheel. To this end, a standard 19 is attached to the head 6 at one side of the grinding wheel and this standard has mounted thereon a vertically movable slide 20 which may be adjusted vertically by means of a suitable lead screw operated by a handwheel 21 at the upper end of the standard. The slide 20 carries a radially disposed barrel 22 in which is mounted a slide 23 which carries at its forward end a dressing point 24 which projects laterally from the slide for engagement with the grinding wheel. The grinding wheel is preferably positioned in the plane of the axis about which the grinder head is adjusted and by moving the tool 24 back and forth across the face of the grinding wheel while the wheel is rotating, the face of the wheel may be accurately dressed so that the tooth engaging portion thereof lies in a vertical plane.

The adjustment of the slide 11 permits the face of the wheel to be adjusted to compensate for material removed therefrom in the grinding operation and in the dressing operations. The slide 23 may be reciprocated by any suitable means. As herein shown, a handwheel 25 is provided by the rotation of which longitudinal movement may be imparted to the slide 23 through a rack and pinion or other suitable mechanism within the barrel.

The grinding wheel is preferably enclosed in a dust guard 26 in the form of a housing which is provided with a removable front face plate 27 which affords the access to the face of the grinding wheel.

Figure 2:
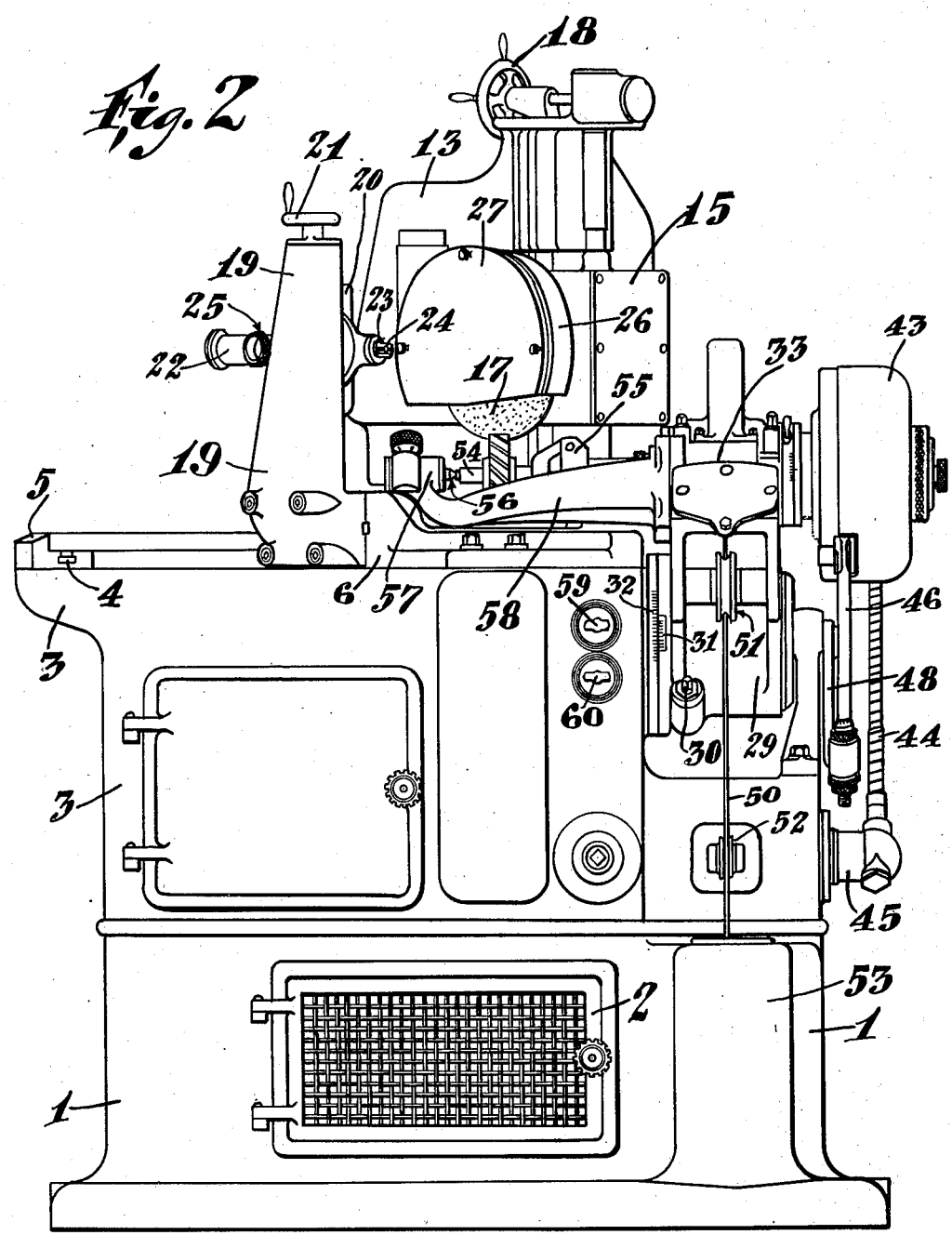
Fig. 2 is an end view in elevation looking toward the left hand end of Fig. 1.
Figure 3:
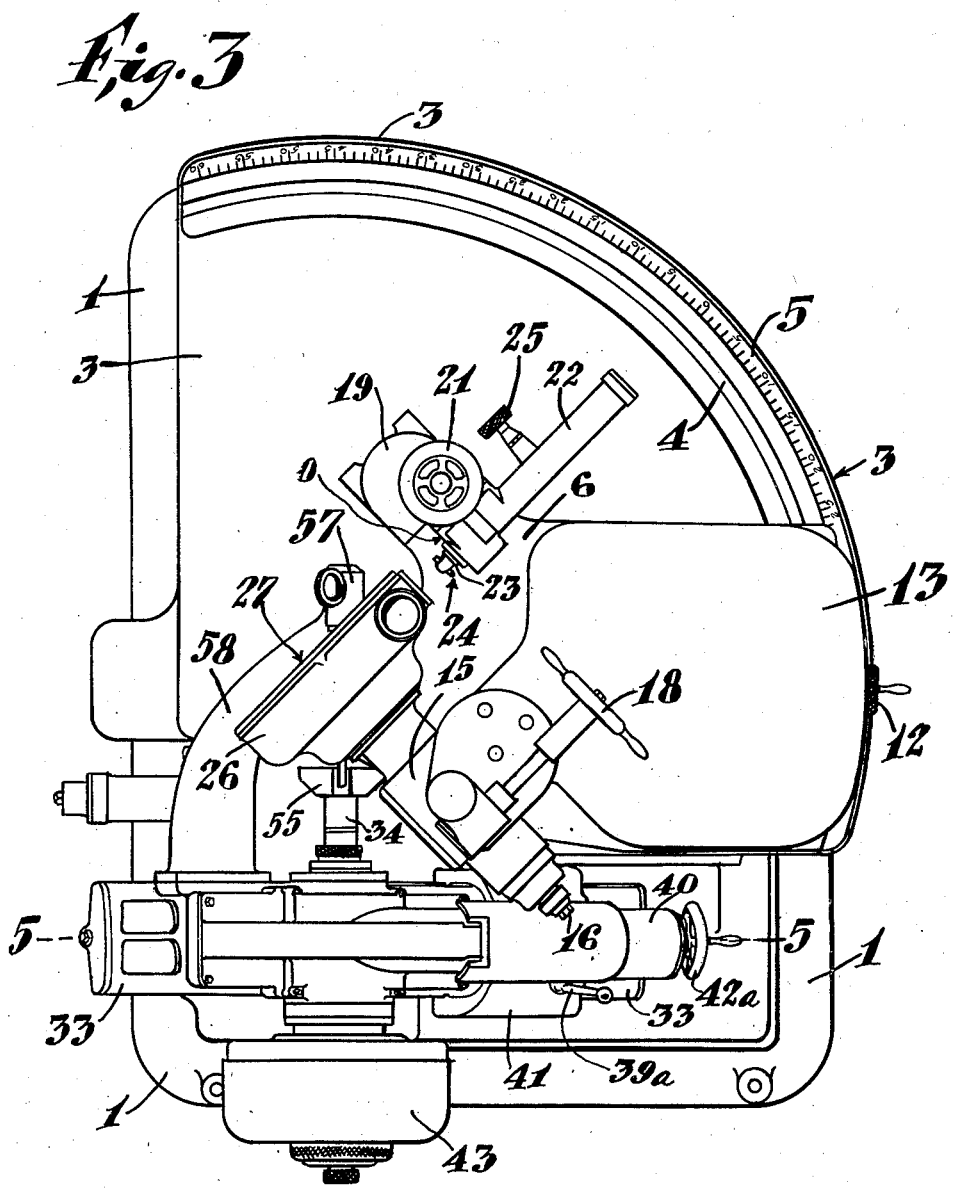
Fig. 3 is a top plan view of the machine.
Figure 4:
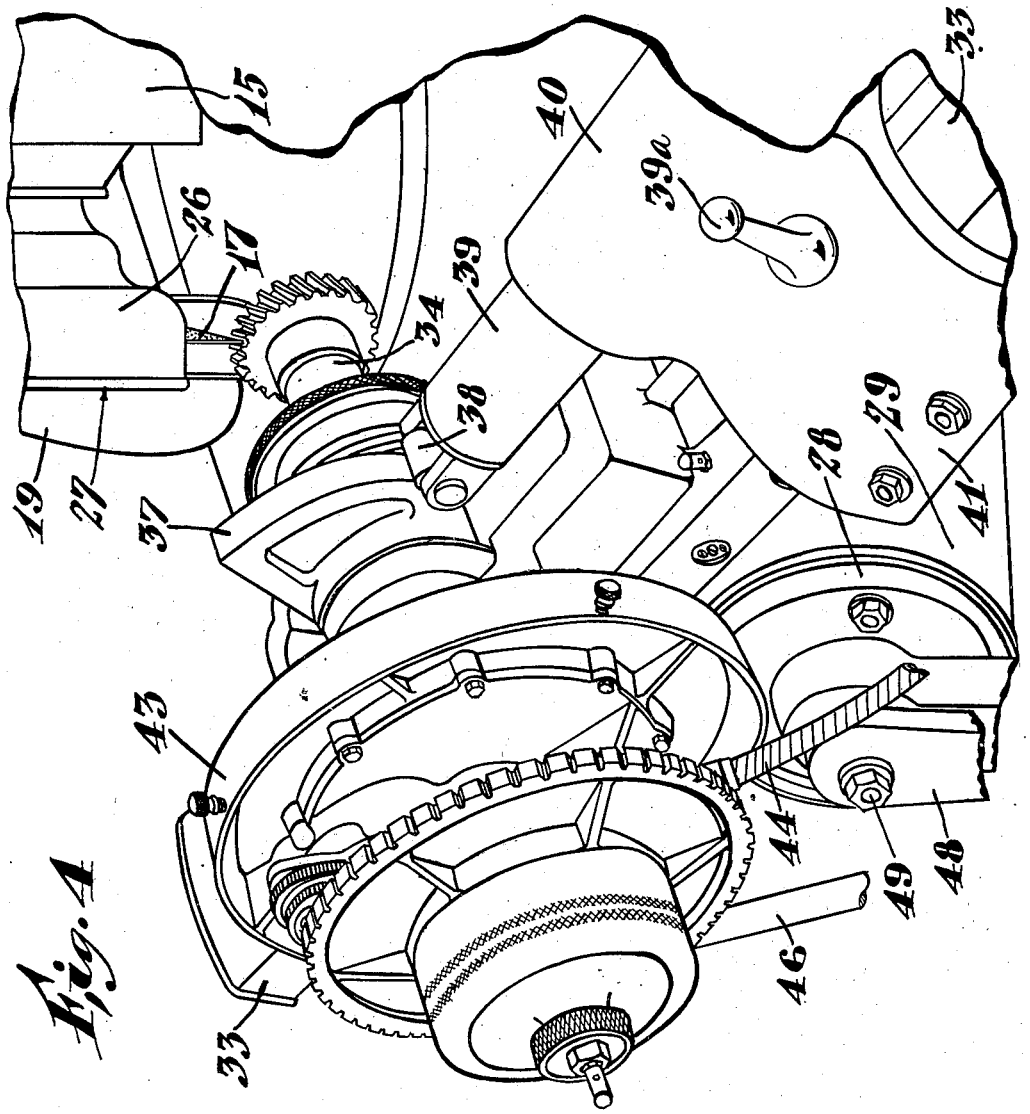
Fig. 4 is a view in perspective of a fragmentary portion of the machine, the cover of the slide being removed to show the spiral cam in contact with its roller abutment.
Figure 5:
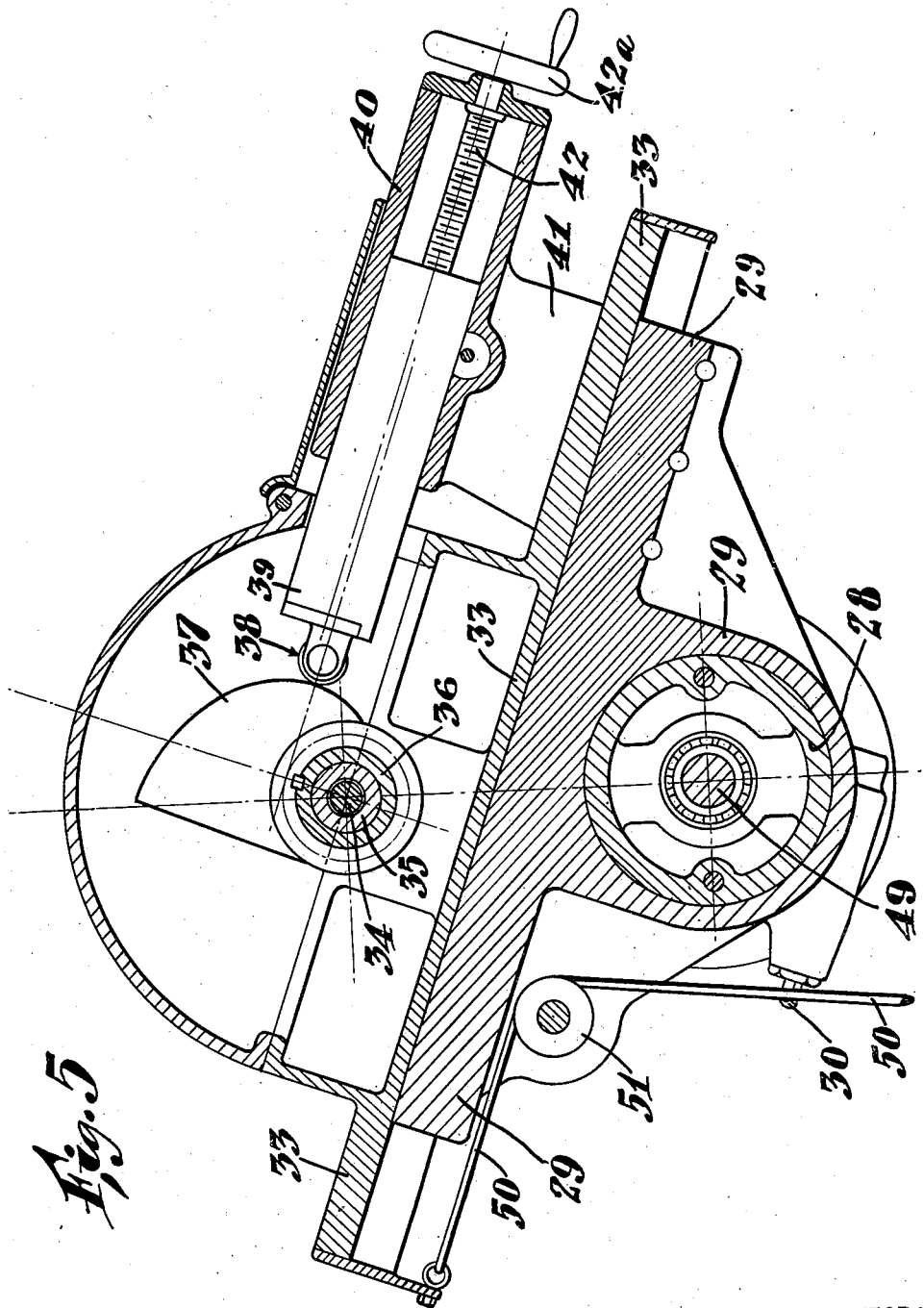
Fig. 5 is a vertical section taken on the line indicated at 5—5 in Fig. 3.

The work supporting and actuating mechanism is mounted at one side of the bed 3 and is carried by a hollow horizontally disposed swivel bearing 28 secured to the frame of the machine below the top of the bed 3 in a position such that its axis intersects the vertically disposed pivotal axis of the supporting head 6. A swiveled work supporting bed 29 is mounted for angular adjustment upon the swivel bearing 28, suitable means being provided for angularly adjusting the bed. While the particular bed adjusting means employed is not material to the present invention, the adjustment may be obtained by means of a shaft 30 shown in Figs. 1, 2 and 5 having a squared end adapted to receive a hand crank, the shaft 30 being provided with a worm engaging a fixed worm gear or worm gear segment for imparting angular movement to the bed 29 upon rotation of the shaft 30. To accurately indicate the position of angular adjustment of the bed 29, the swivel portion of the bed extending around the swivel bearing 28 is provided with a vernier scale 31 which co-operates with a graduated scale 32 secured to the supporting frame.

The bed 29 extends along one side of the bed 3 and has mounted thereon a slide 33 which supports a horizontally disposed work spindle 34. The work spindle 34 is mounted within an intermediate sleeve 35 and the sleeve 35 is mounted within an outer sleeve 36 suitably journaled in the slide.

A cam 37 of spiral curvature and preferably having a spiral curvature conforming to the involute of a circle is keyed to the outer sleeve 36 and engages with an abutment roller 38 whose axis lies in the plane of a tangent to the base circle of the involute of the cam. The abutment roller 38 is adjustable along the tangent to said base circle, being mounted on the forward end of a slide 39 which has a sliding fit in a barrel 40, which is carried by a supporting bracket 41 fixed to the bed 29, which may be adjustable to position the axis of the barrel tangent to base circles of cams having larger or smaller base circles. The abutment slide 39 is adjustable longitudinally of the bed 29 by means of an adjusting screw 42 which is operated by means of a handwheel 42$^a$ and, to securely fix the slide in adjusted positions, suitable clamping means operated by a lever 39$^a$ is provided.

The cam 37 serves to impart a linear movement to the slide 33 which is proportional to the rate of angular movement of the work spindle and is designed to impart the correct generating rolling movement to the work spindle during the grinding operation, the rotary and linear movements of the spindle being the movements which would be imparted to it by the gear being generated in rolling on its imaginary rack, the plane of the grinding wheel coinciding with the plane of a face of a tooth of the rack as well understood in the art. The specific means for effecting the correlated rotary and linear movements to the blank during the grinding operation do not, per se, comprise a part of the present invention and it is to be understood that various devices known in the art may be employed for imparting the rolling generating movement to the work.

In order that the operation of the machine may be continuous, it is common practice to provide means for indexing the work during the intervals between successive engagements of the reciprocating blank with the grinding wheel. To this end, a suitable indexing head 43 is mounted upon the work spindle for intermittently rotating the intermediate sleeve 35 and the spindle 34 within the sleeve 35 through an angle corresponding to one tooth space each time the gear blank is moved out of engagement with the grinding wheel. The work spindle 34 is normally connected to rotate with the sleeve 35, being connected with the sleeve 35 by means normally locking the same to the sleeve 1 but permitting adjustment of the spindle within the sleeve to obtain proper adjustment of the gear blank. The indexing mechanism, which, insofar as the present invention is concerned, may be of any suitable type, serves to lock the sleeve 35 to the outer sleeve 36 so that the spindle rotates with the cam 37 during the grinding operation and operates to rotate the sleeve 35 within the sleeve 36 to index the blank during the portion of the stroke of the work spindle slide 33 in which the gear blank is out of engagement with the grinding wheel and to lock the sleeve 35 to the cam sleeve 36 during the intervals between actuations of the sleeve 35, the index head being provided with continuously driven gearing which acts to intermittently rotate the sleeve 35. The gearing of the index head may be driven by any suitable means such as a flexible shaft 44 driven by the main motor of the machine through suitable gearing in a gear housing 45 mounted on the base of the machine. The outer sleeve 36 and cam 37 are oscillated through an angle sufficient to impart the desired amount of linear movement to the slide 33 by means of a connecting rod 46 secured at its upper end to the sleeve 36 and adjustably connected at its lower end by means of nuts 47 to a crank arm 48. The crank arm 48 is fixed to the outer end of a shaft 49, which extends centrally through the hollow swivel bearing 28, to the interior of the supporting frame, the shaft 49 being oscillated by means of suitable mechanism driven by the main motor of the machine.

The work spindle slide 33 is yieldingly pressed in a direction to hold the cam 37 in engagement with the abutment 38 by means of a counterweight cable 50 which is attached to the forward end of the slide 33 and extends over guide sheaves 51 and 52 to a counterweight within a suitable counterweight housing 53. During rotative movement of the cam 37 in one direction, the slide 33 is moved forwardly by the cam through the action of the cam against the stationary abutment roller 38 and during the rotative movement of the cam in the opposite direction, the slide is moved rearwardly by the counterweight.

The grinding face of the grinding wheel 17 preferably is positioned in a vertical plane which includes the vertical axis about which the grinder head 6 is adjustable so that the grinding wheel is positioned directly over the pivotal axis of the work supporting bed. The angularly adjustable work supporting bed is mounted entirely to one side of the stationary bed 3 in order to be entirely clear of the angularly adjustable grinder supporting head. In order to position the gear blank for linear movement centrally beneath the grinding wheel, an outboard support is provided for the gear blank, the blank being fixed to an arbor 54 which is fixedly secured to the spindle 34 by means of a suitable clamping dog 55. The outer end of the arbor 54 is supported on a dead center 56 carried by a tail stock 57 which is carried by the outer end of an arm 58 rigidly secured to the slide 33 and projecting laterally over the bed 3.

The grinding wheel and work spindle operating mechanism are driven by independent motors mounted in the housing 13 and in the base 1 and these motors are independently controlled by means of suitable switches 59 and 60 mounted upon the front of the machine frame.

In the operation of the machine, the gear blank is first accurately positioned with respect to the grinding wheel by suitable adjustments of the work spindle and of the cam and abutment and then the driving motors are started into operation, causing the slide 33 to be reciprocated on the supporting bed 29 to carry the gear blank into and out of engagement with the grinding wheel. When the bed 29 is in horizontal position, the grinding wheel will generate involute tooth faces having a zero pressure angle, but in any angular position of the work supporting bed 29, the pressure angle resulting from the involute curve generated on the tooth surfaces will be exactly equal to the angle of the work supporting bed with respect to the horizontal.

The generating action of the grinding wheel in the various angular positions of the work supporting bed is fully explained in my patent above referred to.

The present invention contemplates angular adjustment of the grinding wheel to generate helicoid tooth faces of any helix angle throughout a wide range as well as tooth faces of any pressure angle. It has been found, however, that when the supporting bed 29 is positioned at an angle to the horizontal, the proper helicoid tooth surface of a given helix angle is not obtained by angular adjustment of the grinding wheel to an angle with respect to the work spindle corresponding to that of the helicoid surface to be generated. This inaccuracy is due to the fact that the angular adjustment of the grinding wheel is measured in the horizontal plane, whereas its actual plane of action is that of the imaginary rack with respect to which the blank has rolling motion during the grinding operation and this rack is parallel with the work supporting bed 29. In order to generate helicoid tooth faces having both the desired pressure angle and the desired helix angle, the grinder supporting head 6 is adjusted in accordance with a mathematical formula which will now be explained:

In Fig. 6 of the drawing, the plane designated "A" represents the plane in which the grinding wheel operates. The plane "B" represents the horizontal plane in which the angular adjustment of the grinding wheel is measured. The plane "C" represents the plane of the imaginary rack with respect to which the work has rolling motion during the grinding operation, this plane being inclined to the horizontal at an angle equal to the pressure angle of the gear to be generated. The point of intersection of the three planes is indicated at "a", the line of intersection between planes "B" and "C" is indicated by the line "a—b", the line of intersection of planes "A" and "B" is indicated by the line "a—b" and the line of intersection of planes "A" and "C" is indicated by the line "a—d". Lines "e—f" and "e—g" are perpendiculars to the line "a—b" in planes "B" and "C", measuring the angle between planes "B" and "C" and intersecting the lines "a—c" and "a—d". Line "f—g" is the line of intersection between the vertical plane "A" and the vertical plane of the lines "e—f" and "e—g". The helix angle of a tooth face generated by the grinding wheel in the plane "A" is represented by "X", being the angle between the lines "a—b" and "a—d" in the plane "C". The angle designated "Y" between lines "e—f" and "e—g" is the pressure angle of the tooth faces which will be generated with the work supporting bed set to the inclination of the plane "C". The angle "Z" is the angle between the lines "a—b" and "a—c" in the horizontal plane "B", which is the angle to which the grinding wheel should be set to generate a helicoid tooth face having the pressure angle "Y" determined by the angular adjustment of the work supporting bed and having the desired helix angle "X".

$$\tan X = \frac{eg}{ea} \quad \tan Z = \frac{ef}{ea}$$

$$ef = eg \cos Y \therefore \tan Z = \tan X \cos Y$$

Since the angle "Z" represents the angle of adjustment of the grinding wheel measured in a horizontal plane, which will result in the generation of a helicoid tooth face having the helix angle "X" when the work supporting body is set to the angle of the plane "C", it follows that for a given adjustment of the work supporting bed, the angular adjustment of the grinding wheel head for a given helix angle should be the angle whose tangent is equal to the tangent of the helix angle of the gear times the cosine of the axial pressure angle, i. e., of the angle with respect to the horizontal to which the work supporting bed is set.

In Figs. 8 to 10 of the drawing, there is shown a modified form of wheel dressing mechanism in which the dressing tool is directly mounted upon the dust guard which encloses the grinding wheel. This dust guard 61 is provided at one side with a horizontal way 62 perpendicular to the plane of the grinding wheel in which is mounted a slide 63. The slide 63 may be adjusted by means of a screw 64 which is operated by means of a handwheel 65 which has a graduated scale 66 on its periphery which co-operates with a zero point or line 67 on the casing to accurately indicate the extent of adjustment of the slide 63. The slide 63 carries a swiveled head 68 which has a graduated periphery 69 which co-operates with a zero line 70 on the slide to indicate the angular adjustment of the head. The head 68 carries a horizontal barrel 71 in which is mounted a slide 72 which projects from the end of the barrel and carries a dressing point 73 of diamond or other suitable material for engagement with the face of the grinding wheel. The slide 72 is reciprocated by any suitable means, a handwheel 74 being herein shown which may be connected by suitable gearing to the slide to actuate the same. The dust guard 61 has a removable front plate 75 which is provided with a sight opening over the portion of the wheel acted upon by the dressing point which is closed by means of a pivoted flap or closure member 76.

In operating the dressing tool, the head 68 is adjusted to accurately position the axis of the slide 72 parallel with the face of the grinding wheel and the slide 63 is adjusted to bring the dressing point into contact with the face of the wheel. The slide 72 projects through an opening in the side wall of the dust housing and, by operating the hand wheel 74, the dressing point may be reciprocated across the face of the grinding wheel while the same is rapidly rotated to accurately true the wheel.

What I claim is:

1. The herein described method of generating on teeth of gear shaped articles, involute helicoid surfaces having any desired axial pressure angle and any desired angle of helix by means of a cutting element engaging teeth of the blank in a single plane while the blank is oscillated about its axis and is simultaneously given correlated linear movements toward and away from the cutting element, which comprises adjusting the direction of linear movement of the blank to an angle equal to the desired pressure angle with respect to a plane perpendicular to the plane of the cutting element, and adjusting the cutting element about a fixed axis disposed at right angles with respect to the axis of the blank to an angle with respect to a plane including said fixed axis and perpendicular to the axis of the blank such that the lines of intersection of the last mentioned plane and of the plane of the cutting element with the plane of movement of the blank intersect each other at an angle equal to the desired helix angle.

2. The herein described method of generating on teeth of gear shaped articles, involute helicoid surfaces having any desired axial pressure angle and any desired angle of helix by means of a cutting element engaging teeth of the blank in a single plane while the blank is oscillated about its axis and is simultaneously given correlated linear movements toward and away from the cutting element, which comprises adjusting the direction of linear movement of the blank to an angle equal to the desired pressure angle with respect to a plane perpendicular to the plane of the cutting element and adjusting the cutting element about a fixed axis disposed at right angles with respect to the axis of the blank to an angle with respect to a plane including said fixed axis and perpendicular to the axis of the blank which, measured in a plane perpendicular to said fixed axis, is the angle whose tangent is equal to the tangent of the desired helix angle times the cosine of the pressure angle.

3. The herein described method of generating on teeth of gear shaped articles, involute helicoid surfaces having any desired axial pressure angle and any desired angle of helix by means of a cutting element having a tooth engaging portion disposed in a vertical plane and engaging a blank carried by a reciprocating slide and having rotary movement about its axis during engagement with the cutting element, which comprises adjusting the direction of movement of the slide to an angle to the horizontal equal to the desired pressure angle, and adjusting the cutting element about a fixed vertical axis to an angle to the blank axis such that the complement of this angle measured in a horizontal plane is the angle whose tangent is equal to the tangent of the desired helix angle times the cosine of the axial pressure angle.

4. In a machine of the character described, a supporting frame, a head mounted on said frame for angular movement about a vertical axis, a grinding wheel carried by said head, a motor carried by said head for driving said grinding wheel, a work support mounted on said frame beneath the grinding wheel for angular movement about a horizontal axis, a slide on said support, a work spindle on said slide, means for oscillating said spindle, and means for simultaneously reciprocating said slide.

5. In a machine of the character described, a supporting frame, a head mounted on said frame for angular movement about a vertical axis, a grinding wheel carried by said head, a motor carried by said head for driving said grinding wheel, a work support mounted on said frame beneath the grinding wheel for angular movement about a horizontal axis, a slide on said support, a work spindle on said slide, means for oscillating said spindle, and means operated by said spindle for reciprocating said slide.

6. In a machine of the character described, a supporting frame, a head mounted on said frame for angular movement about a vertical axis, a grinding wheel carried by said head, a motor carried by said head for driving said grinding wheel, a work support mounted on said frame beneath the grinding wheel for angular movement about a horizontal axis, a slide on said support, a work spindle on said slide, means for oscillating said spindle, means operated by said spindle for reciprocating said slide, and means for varying the reciprocating movements of said slide.

7. In a machine of the character described, a supporting frame having a stationary bed thereon, a head mounted on said bed for angular adjustment about an axis perpendicular to the bed, a grinding wheel mounted on said head and having a plane face lying substantially in a plane including said axis, a second bed at one side of said first mentioned bed and swiveled on the frame for angular adjustment about an axis perpendicular to the first mentioned axis, a slide mounted for linear movement on said swiveled bed, a work spindle journaled in said slide and extending transversely thereof, a blank supporting arbor rigidly secured to said work spindle and extending over the stationary bed beneath the grinding wheel, a laterally extending arm rigidly secured to said slide, said arm having at its outer end a bearing for the outer end of said arbor.

8. The method of generating on teeth of gear-shaped articles involute helicoid surfaces having any desired axial pressure angle and any desired angle of helix by means of a cutting element engaging the teeth of the blank in a single plane while the blank is oscillated about its axis and is simultaneously given correlated linear movement toward and away from the cutting element, comprising angularly adjusting the direction of linear movement of the blank with respect to a plane perpendicular to the plane of the cutting element an amount equal to the desired axial pressure angle, and angularly adjusting the cutting element with respect to the blank axis to a computed angle different from the helix angle desired but such that the resulting generated helicoid teeth surfaces have the desired angle of helix.

9. The method of generating on teeth of gear-shaped articles involute helicoid surfaces having any desired axial pressure angle and any desired angle of helix by means of a cutting element engaging the teeth of the blank in a single plane while the blank is oscillated about its axis and is simultaneously given correlated linear movement toward and away from the cutting element, comprising angularly adjusting the direction of linear movement of the blank with respect to a plane perpendicular to the plane of the cutting element an amount equal to the desired pressure angle, and adjusting the cutting element so that the angle between the line of intersection of the plane of operation of the cutting element with a horizontal plane and the line of intersection of the said horizontal plane with the plane of the linear movement of the blank equals a predetermined angle different from the helix angle desired but such that the resulting generated helicoid teeth surfaces have the desired helix angle.

In testimony whereof I affix my signature.

OLIVER G. SIMMONS.